United States Patent Office 3,316,199
Patented Apr. 25, 1967

3,316,199
LATEX COMPRISING THE POLYMERIZATION PRODUCT OF AMORPHOUS POLYISOBUTYLENE, A VINYL AROMATIC COMPOUND AND AN ALKYL ACRYLATE
Ira Arthur Murphy, Midland, Mich., assignor to The Dow Chemical Company, Midland, Mich., a corporation of Delaware
No Drawing. Filed June 13, 1963, Ser. No. 287,493
16 Claims. (Cl. 260—29.6)

This invention relates to new aqueous compositions which form homogeneous, coherent films when dried and to a method for preparing such compositions.

Usually synthetic latexes are prepared by emulsion polymerization of the appropriate monomers. However, some monomers such as isobutylene are not polymerized at a commercially acceptable rate by emulsion polymerization techniques. To prepare a latex of such material, the monomer is polymerized in mass or in solution in a suitable solvent, and a solution of the resulting polymer in a solvent is dispersed in an aqueous medium with the aid of a surface active agent and stirring. The solvent is then removed by steam distillation, azeotropic distillation or similar means so that latexes of acceptable percent composition of polymer are obtained. Such a solvent removal step often is troublesome and results in additional cost for the latex product. If pre-prepared polymers of a sufficiently low molecular weight are used that they readily can be dispersed in aqueous media without the use of a solvent, then they have too low molecular weight to possess the good elastomeric properties ordinarily expected from the polymer in a synthetic latex.

One of the disadvantages of styrene-butadiene latexes, or other synthetic latexes which might be considered as composed of polymerized dienes in any significant amount, has been the characteristic of being subject to oxidative attack which results in embrittlement and in discoloration of the product. This attack is believed to take place at the residual ethylenic double bond or at a site adjacent thereto. By preparing a composition in which this ethylenic double bond is not present, improved heat and light stability results. However, such a product must be film-forming in order to be useful in many of the current applications for latexes. Homopolymers of vinyl aromatic compounds such as styrene do not have ethylenic unsaturation which can result in excess cross-linking and discoloration on ageing but they are not film-forming at room temperature.

Previous proposals for preparing film-forming latexes from vinyl monomers such as styrene have involved three general methods: (1) emulsion polymerization of the monomer dispersed in aqueous media with subsequent addition of a plasticizer (often as a preformed emulsion), (2) emulsion polymerization of a mixture of the monomer and a plasticizer wherein the mixture is dispersed in aqueous media, and (3) copolymerization by emulsion polymerization methods of a vinyl aromatic monomer and another monomer which, when polymerized by itself, forms a soft polymer. The addition of a plasticizer to a latex of a preformed polymer (method 1) is attended by many difficulties, in particular the difficulties of obtaining uniform plasticization of the dispersed polymer particles, each having a protective colloid barrier, without coagulating the latex. The presence of plasticizers during the emulsion polymerization of styrene and related materials (method 2) often inhibits the polymerization and/or causes the formation of low molecular weight polymer rather than the desired high molecular weight polymer and/or causes the emulsion to "break," i.e., coagulate partially or completely. Often, the plasticizer separates to form a sticky mass or a separate dispersion. Even when by methods 1 and 2 the desired distribution is obtained in the aqueous dispersion, coatings compositions made therefrom often have the undesirable characteristic of migration of the plasticizer so that uniform plasticization is not retained and additionally subsequent coatings may extract portions of the plasticizer with consequent difficulties in drying and in the appearance, especially in the case of paints. Polybutenes have been suggested as plasticizers for use in method 1. However, as shown in the subsequent examples, a latex plasticized with emulsified polybutene is not equivalent to the products of my invention. Method 3 is not applicable for preparing copolymers of vinyl aromatic monomers with isobutylene because copolymerization in desired ratios does not occur at acceptable rates under emulsion polymerization conditions.

It is an object of this invention to provide new coating compositions and a process for their preparation. It is a related object to provide new polymeric compositions dispersed in aqueous media. A further object is to provide new aqueous coatings compositions which, when dried, deposit a homogeneous, continuous, coherent film. A still further object is to provide new aqueous coatings compositions which, when dried, deposit a homogeneous, coherent film which is resistant to discoloration and embrittlement upon subsequent ageing. Yet a further object is to provide in aqueous media a binder for pigments for coatings to be applied to a substrate. A related object is to provide a pigment binder for use in water-dilutable paint formulations.

The above and other objects of this invention are attained in improved aqueous dispersions of copolymer compositions comprising the emulsion polymerization product of (1) a monomer mixture comprising a monovinyl aromatic monomer and an acrylic ester, as hereinafter defined, having dissolved therein (2) an amorphous poly(alpha-olefin) having a Staudinger molecular weight of from about 300 to about 11,000.

The amorphous poly(alpha-olefin) is characterized as having a Staudinger molecular weight of from about 300 to about 11,000, preferably from about 1,000 to 8,000, and preferably comprises polymers of the C-4 olefins such as isobutylene, 1-butene, 2-butene and mixtures thereof, especially such polymers which contain a major proportion of units derived from isobutylene. Such polybutenes are available commercially from several sources. Desirably, the poly(alpha-olefin) has a viscosity such that it will flow by gravity to a visually observable extent within about 5 seconds at a temperature below about 210° F. The preferred poly-olefins have a viscosity greater than about 3,000 SSU at 210° F. (Viscosity in Saybolt Universal seconds—see ASTM D341–43.)

The vinyl aromatic monomer is represented by styrene and the aryl-substituted styrenes such as hydroxystyrene, methoxystyrene, p-t-butylstyrene, vinyltoluene, ar-ethylstyrene, ar,ar-dimethylstyrene, vinyl naphthalene, the various chlorinated styrenes such as ortho-chlorostyrene, para-chlorostyrene and 2,4-dichlorostyrene, and the like.

The acrylic esters useful in the practice of this invention are the alkyl esters of acrylic acid having from 4 to 10 carbon atoms in the alkyl portion. Representative such acrylic esters are n-octyl acrylate, hexyl acrylate, n-decyl acrylate and especially 2-ethylhexyl acrylate, n-butyl acrylate and isobutyl acrylate.

There may be included with the vinyl aromatic monomer and the alkyl acrylic ester monomer small proportions of other monomers copolymerizable with styrene such as acrylic acid, fumaric acid, methacrylic acid, itaconic acid, acrylonitrile, maleic half esters, butadiene, alkyl esters of methacrylic acid, other alkyl esters of acrylic acid having less than 4 or more than 10 carbon atoms in the alkyl portion, and the like, if desired. When used, such added monomers are usually used in amounts up to about 5 percent of the total monomer/polymer content; although up to about 10 percent may be incorporated into the composition, ordinarily such additional amounts above about 5 percent are not advantageous. There also may be included minor amounts of surface-active monomers (sometimes called comonomeric emulsifiers) such as 2-aminoethyl methacrylate hydrochloride, sodium styrene sulfonate, sodium alphamethylstyrene sulfonate and the like. Usually, less than about 2 percent by weight, based on the total monomer/polymer weight of these comonomeric emulsifiers is used. Such materials add to the stability of the latex product and can provide advantageous other properties such as increased adhesion to substrates, e.g., paper.

In preparing the products of this invention, the starting materials comprise from about 20 to about 42 percent of the vinyl aromatic monomer, from about 23 to about 60 percent of the alkyl ester of acrylic acid, and from about 20 to about 35 percent of the poly(alpha-olefin), by weight based on the mixture of such monomers and polymer.

In the practice of this invention, to prepare the compositions contemplated therein, ordinarily three separate solutions are prepareld, blended as described below, and the polymerization carried out. Solution A consists of the poly(alpha-olefin), the vinyl aromatic monomer and the alkyl ester of acrylic acid (all as heretofore defined) and any other oil-soluble monomers which are used in minor amounts and all in the proportions as described. Optionally, there may be included in solution A a non-ionic emulsifier when such is part of the recipe. Solution C is prepared from water, the water-soluble catalyst and may include a pH buffer if such is used. The proportion of water in solution C is not critical so long as a sufficient quantity is used to dissolve the particular catalyst and buffer and further that too large an excess is not used to reduce unduly the solids content of the final product. Solution B is prepared from the ionic emulsifier, any water-soluble ingredients not described as included in solutions A and C, and sufficient water such that the total amount in solution B and C provides a desired ratio often from about 96 to about 110 parts by weight of water per 100 parts by weight of the monomer/polymer blend in solution A—but other ratios such as to give products having a higher solids content as up to about 60 percent by weight or as little as 20 percent by weight, or lower, may be used, if desired.

Solutions A and B individually are heated to a temperature preferably from about 50° to about 85° C., then thoroughly blended, usually by adding solution B to solution A with stirring to form a preliminary emulsion which is subjected to the action of a high shear mixer such as the Eppenbach mixer or is passed through a homogenizer. This blending step is sometimes referred to hereafter as the pre-emulsification step. Solution C is added and agitation of the entire mixture is continued at the predetermined temperature, preferably from about 50° to about 85° C., although temperatures up to about 98° C. may be used, until polymerization essentially is complete—usually from about 3 hours to about 15 hours, depending somewhat on the monomer composition selected for solution A, the polymerization temperature and kind and amount of catalyst. Longer schedules can be used as has been shown, for example, by one series of 8 variations within the ranges of compositions and conditions described, wherein the compositions were kept at polymerization temperature (70° C.) for 114 hours without harming the products.

As polymerization catalysts, there are used one or more peroxides which are known to act as free radical catalysts and which are water-soluble. Usually convenient are the persulfates (including ammonium, sodium and potassium persulfates), hydrogen peroxide or the perborates or percarbonates. The water-soluble catalysts are included in solution C. Usually organic peroxides, if used, are in addition to the inorganic peroxide compound and preferably are added after the pre-emulsification step either immediately before or immediately after solution C. Since such organic peroxides are rather insoluble in water, they usually are added either as a solution in an organic solvent, e.g., benzene, or if liquid, may be added undiluted. However, organic-soluble solid and liquid peroxides may be added to solution A if the subsequent pre-emulsification step is carried out at a sufficiently low temperature that appreciable polymerization is not caused to occur before the emulsification is complete. Typical organic peroxides include benzoyl peroxide, t-butyl hydroperoxide, cumene peroxide, acetyl peroxide, caproyl peroxide, t-butyl perbenzoate, t-butyl diperphthalate, methyl ethyl ketone peroxide and the like. The usual amount of catalyst is from about 0.01 percent to about 3.0 percent, by weight, based on the weight of the monomer/polymer blend.

In some instances, in order to effect polymerization at a lower temperature, it may be desirable to activate the catalyst. The activation may be accomplished by using a redox system in which a reducing agent within the limits of about 0.0005 percent to about 3.0 percent, based on the weight of the monomer/polymer blend is added to solution C or to the emulsion of solutions A, B and C. Agents such as hydrazine or a solid oxidizable sulfoxy compound, including the alkali metal salts of hydrosulfates, sulfoxalates, thiosulfates, sulfites and bisulfites, and the like may be employed. Redox systems may be activated by the presence of a small amount (a few parts per million) of polyvalent metal ions. Ferrous ions are commonly and effectively used.

Optionally, the starting composition may include chain regulators, chelating agents and acids, bases or salts to provide a desired pH value or possibly a buffered system. Any of such agents which are water-soluble are added to solutions B or C or to the emulsion after addition of solution C whereas the oil-soluble materials usually are added to solution A.

The emulsifiers useful in the practice of this invention include a wide variety of non-ionic, anionic and cationic surface active agents although indiscriminate substitution is not possible. Often, use of more than one surface active agent is advantageous. Especially useful are complemental incorporation of a non-ionic and an anionic emulsifier for anionic latexes or of a non-ionic and a cationic emulsifier for cationic latexes. As indicated heretofore, the non-ionic surface active material usually is added to solution A whereas the ionic (i.e., anionic or cationic) emulsifier is part of solution B. No instance has been found whereby a non-ionic surface active agent alone or a cationic emulsifier alone is sufficient. However, a mixture of anionic emulsifiers or a single anionic agent such as sodium butyl naphthalene sulfonate has been found effective. A recipe with a single emulsifier, however, requires closer control of polymerization conditions (as determined by simple trial or preliminary experiment with the particular composition) including total inorganic salt content and possible use of a chain transfer agent, e.g., carbon tetrachloride. The complementary use of a non-ionic agent such as isooctylphenoxy polyethoxy ethanol (having an average of from about 8 to about 10 ethoxy groups per molecule) and an ionic surfactant such as sodium dodecylbenzene sulfonate or lauryl dimethylamine sulfate is more versatile and ordinarilly is preferred unless the product of the invention is to be used subsequently with ingredients which are less effective when used with, or are incompatible with, for example, the non-ionic surfactant. The ratio, non-ionic surfactant: ionic surfactant, usually is from about 4:3 to about 7:3 although ratios outside these limits may be used. Illustrative of the non-ionic emulsifiers are the alkylaryl polyether alcohols especially the condensation products of an alkyl phenol and ethylene oxide wherein the alkyl group has from 7 to 10 carbon atoms and the adduct has from 8 to 12 moles of ethylene oxide residues per mole of the alkyl phenol. Representative commercial materials are sold under the trade names "Triton X–100," "Triton X–45" and "Dowfax 9N9." The anionic emulsifiers are represented by t-butyl naphthalene sulfonate, octyl alcohol sodium sulfate, dioctyl ester of sodium sulfosuccinic acid, sodium xylene sulfonate and sodium lauroyl sarcosinate. Representative operable cationic emulsifiers are primary fatty amines, ethylene oxide condensation products with primary amines, lauryl dimethylamine citrate, lauryl dimethylamine sulfate, and an ethanolated alkyl guanidine amine complex sold commercially as "Aerosol C–61." The total amount of emulsifier required ranges from about 2 parts to about 10 parts per 100 parts of the monomer/polymer mixture, all parts by weight. As is known by those skilled in the art, emulsifiers, as commercially sold and used, usually are not pure compounds. For example, the known methods of alkylating and sulfonating naphthalene to produce an alkyl naphthalene sulfonate result in the production of some dialkylated naphthalene monosulfonate and some monoalkylated naphthalene disulfonate even though conditions were selected to produce primarily the monoalkylated monosulfonated naphthalene. Such mixtures are effective and included in the term alkyl naphthalene sulfonate, e.g., in sodium t-butyl naphthalene sulfonate, there may be some sodium di-t-butylnaphthalene monosulfonate and some sodium t-butylnaphthalene disulfonate.

The pre-emulsification step is somewhat critical to the practice of this invention. After blending solutions A and B to form a preliminary emulsion to obtain the advantageous products provided by the invention, it is necessary to treat the preliminary emulsion further by a procedure which can be called homogenization. This homogenization can be carried out by forcing the preliminary emulsion under pressure through a small orifice or between closely clearing but relatively fixed surfaces by means of a high pressure pump for at least one complete pass. A high shear mixer such as the Eppenbach mixer also is effective. While the above methods are preferred, colloid mills, high speed venturi tubes, ultrasonic or sonic vibrations, or other mechanical high shear devices and homogenizers applicable to liquid-liquid systems as well as very vigorous, high-speed stirring also are used. Insufficient homogenization treatment may become evident by a sticky residue in the final latex product or separation of the emulsion.

After the pre-emulsification step followed by the addition of solution C, agitation is advantageous as in ordinary emulsion polymerization procedures. The rate of agitation to be used in any particular instance will be dependent primarily on the overall design of the polymerization equipment. The minimum amount of agitation required to maintain the dispersion is usually to be desired.

An aqueous dispersion paint prepared from the latex hereinbefore described by admixture with a formulation comprising a paint pigment is included within the concept of this invention. Such paint pigments include, for example, titanium dioxide (rutile and/or anatase), lithopone, zinc oxide, mica, china clay, barium sulfate, calcium carbonate, dolomite, calcium silicate, diatomaceous earth, iron oxide, chromic oxide, carbon black, sienna, umber, ochre and prussian blue. Usually a water dispersion of the pigments is first prepared, then the latex is blended with the dispersion. Typical materials included in the aqueous emulsion paint formulations are wetting and dispersing agents, such as polyphosphates, pyrophosphates, anionic and non-ionic surfactants and polyvinyl alcohol; thickeners and pigment stabilizers such as sodium carboxymethyl cellulose, methyl cellulose, alginates and proteins; coalescing solvents such as butoxyethyl acetate, toluene and xylene; pH adjusters such as ammonia, bicarbonates, carbonates and phosphates; defoamers such as silicones, tributylphosphate, pine oil and ethylene oxide condensates; freeze-thaw stabilizers such as ethylene glycol and diethylene glycol; and preservatives such as phenyl mercuric compounds, e.g., phenyl mercuric acetate and phenyl mercuric oleate.

Having generally described the features of this invention, the following examples are given to illustrate more fully to those skilled in the art the practice of this invention without intending any limitations thereby. All parts and percentages are by weight unless otherwise indicated.

*Example 1.*—Solution A was prepared from 40 parts of styrene, 30 parts of 2-ethylhexyl acrylate, 30 parts of a polybutene (a polymer from predominantly isobutylene units with minor amounts of units from other butenes) having a molecular weight of approximately 1,100, and 4 parts of an isooctylphenoxy polyethoxy ethanol having an average of from about 8 to about 10 ethoxy units per molecule. Solution B was prepared from 90 parts of water and 3.0 parts of an emulsifier in which the active ingredient is dodecylbenzene sodium sulfonate at about 85 percent concentration. Solutions A and B were separately but concurrently heated to a temperature of about 70° C. Solution A was stirred vigorously while solution B was added slowly thereto. After completion of the addition, further blending was accomplished by the action of the Eppenbach high-shear mixer for about 3 minutes. Solution C, which had been prepared previously from 10.0 parts of water, 0.30 part of potassium persulfate and 0.15 part of sodium bicarbonate, was added to the blend of solutions A and B. The aqueous dispersion obtained thereby was put in a closed container which was attached to the periphery of a drum which was rotated about 20 r.p.m. in a water bath at 70° C. for 15 hours. The product was a film-forming latex of 50.6 percent solids from which no residue was obtained when it was filtered through a 100 mesh screen.

Similar stable, film-forming latexes were prepared from the same composition except for substitution of the emulsifiers. Other non-ionic emulsifiers such as other alkylaryl polyether alcohols were substituted for the isooctylphenoxy polyethoxy ethanol in solution A. Similarly, other anionic emulsifiers such as t-butyl naphthalene sodium sulfonate, octyl alcohol sodium sulfate, dioctyl ester of sodium sulfosuccinic acid, and sodium lauroyl sarcosinate were substituted for the anionic emulsifier in solution B and other anionic emulsifiers, such as dodecyl diphenyloxide disulfonic acid, sodium salt, were mixed therewith.

For purposes of comparison with the product of Example 1, there was prepared a blend containing the same ingredients but not produced by the process of this invention nor combined in the same manner as the product of this invention. A latex (not a latex of the invention) was prepared by the same steps using the same emulsifiers and from styrene and 2-ethylhexyl acrylate in the same proportions as in Example 1, i.e., in the ratio of 4 parts of styrene to 3 parts of 2-ethylhexyl acrylate, but having no polybutene therein. There was also prepared an emulsion of the same polybutene as used in Example 1 and also using the same emulsifiers in the same proportions. The styrene/2-ethylhexyl acrylate latex and the polybutene emulsion were then blended in such proportions as to give the same total and ratio of ingredients as in Example 1. A thin layer of the composition was confined on a glass plate and was allowed to air dry to form a film. Within two days, however, an oily, sticky exudation was evident on the dried film. Films prepared in the same manner from the latex of Example 1 showed no such stickiness or oiliness. In fact, after the comparison at the end of the 2-day period, no change in the appearance or properties could be detected in the film from the product of Example 1 during the period of observation, i.e., about 19 months.

*Examples 2–20.*—Other latexes were prepared according to the method of Example 1 with differing monomer/polymer compositions as shown in Table I.

lowed to dry on the spot plate at ambient temperature for about 1 day before being placed in an oven at 120° C.

TABLE I

| Example Number | Aromatic Monomer Kind | Aromatic Monomer Parts by Weight | Ester Monomer Kind[3] | Ester Monomer Parts by Weight | Polybutene[1] Approx. Mol. Wt. | Polybutene Other Description | Polybutene Parts by Weight | Other Monomers Kind | Other Monomers Parts by Weight | Residue[2] Parts by Weight |
|---|---|---|---|---|---|---|---|---|---|---|
| 1 | Styrene | 40 | 2-EHA | 30 | 1,100 | | 30 | | | 0 |
| 2 | do | 20 | iBA | 50 | 1,100 | | 30 | | | 0 |
| 3 | do | 40 | nBA | 40 | 1,900 | | 20 | | | 0 |
| 4 | do | 40 | nBA | 40 | 10,800 | | 20 | | | 0 |
| 5 | do | 30 | 2-EHA | 40 | 10,800 | | 30 | | | 0 |
| 6 | do | 30 | iBA | 50 | 1,100 | | 20 | | | 0 |
| 7 | Vinyl toluene | 40 | 2-EHA | 30 | 1,100 | | 30 | | | 0 |
| 8 | p-t-Butyl styrene | 40 | 2-EHA | 30 | 1,000 | PIB | 30 | | | 0 |
| 9 | Styrene | 40 | 2-EHA | 30 | 3,000 | PIB | 30 | | | 1.5 |
| 10 | do | 40 | 2-EHA | 30 | 8,000 | PIB | 30 | | | 2.5 |
| 11 | do | 40 | 2-EHA | 20 | 10,000 | PIB | 30 | | | 11.0 |
| 12 | do | 40 | 2-EHA | 30 | 12,000 | PIB | 30 | | | 12.0 |
| 13 | do | 40 | 2-EHA | 30 | 15,000 | PIB | 30 | | | 0 |
| 14 | do | 30 | nBA | 32 | 1,900 | | 35 | Butadiene | 3 | 0 |
| 15 | do | 40 | 2-EHA | 27 | 1,900 | | 30 | do | 3 | 0 |
| 16 | do | 30 | nBA | 35 | 1,900 | | 30 | do | 5 | 0 |
| 17 | do | 30 | 2-EHA | 30 | 1,900 | | 30 | do | 10 | 0 |
| 18 | do | 30 | 2-EHA | 27 | 1,900 | | 30 | Acrylic acid | 3 | 0 |
| 19 | do | 40 | 2-EHA | 30 | 1,100 | | 30 | {Acrylic acid / Fumaric acid} | {0.5 / 0.5} | |
| 20 | do | 40 | 2-EHA | 50 | | None | | | | |
| 7B[4] | Vinyl toluene | | 50 | iBA | 50 | | | | | |

[1] PIB = polyisobutylene containing no more than a trace of residues from other butenes. Except for PIB (as indicated), the polybutenes contain minor amounts of residues from other butenes.
[2] Residue = solid material retained when product was filtered through a 100 mesh screen (damp weight).
[3] 2-EHA = 2-ethylhexyl acrylate; iBA = isobutyl acrylate; nBA = n-butyl acrylate.
[4] Not an example of this invention.

Numerous tests and comparisons were made with the composition shown in Table I and in Example 1 including comparisons with materials which are not compositions of the invention. Representative of these tests and comparisons are the following:

All the examples of the invention listed in Table I were stable, film-forming latexes, having a particle size averaging generally from 1800 to about 2800 Angstroms as determined by the Brice Phoenix Light Scattering Photometer. In comparison, material 7B (not a latex of this invention) having an additional amount of vinyl toluene substituted for the quantity of polybutene of Example 7 did not form a continuous film at room temperature upon evaporation of the water whereas the latex of Example 7, under the same conditions, produced a clear, continuous film which had good strength and could be stretched more than 300 percent before breaking.

Certain of the latexes were tested for discoloration when subjected to high temperature in the following manner. Five drops of the latex being tested were placed in the depression of a white spot plate (a glazed porcelain plate having uniform sized small depressions therein) then heated for 1 hour at 60° C. and for two hours at 170° C. in an oven. All of the latexes shown in Table II were tested concurrently and were rated for color development by direct comparison with standard color chips having progressively increased degree and darkness of color as the numbers increase from 1 to 10 with No. 1 having barely detectable color, if any, and No. 10 being rather dark (about the color of maple syrup). The results are shown in Table II including a comparison with a commercial latex treated in the same manner concurrently.

TABLE II

| Latex used: | Rating |
|---|---|
| Example No. 1 | 2 |
| Example No. 15 | 2+ |
| Example No. 16 | 2+ |
| Example No. 17 | 3− |
| Example No. 18 | 5 |
| An acrylic latex as described in U.S. 2,795,564 | 9+ |

Another heat test was carried out with the latexes and corresponding results shown in Table III. In this test, after being placed in the spot plate, the latexes were allowed to dry on the spot plate at ambient temperature for about 1 day before being placed in an oven at 120° C. Comparisons were made with the color chips at the time periods shown in Table III.

TABLE III

| Latex | Rating After Specified Number of Hours at 120° C. | | | | |
|---|---|---|---|---|---|
| | 5 | 10½ | 17½ | 30 | 55 |
| Example 1 | | 2 | 2 | | [1]2 |
| Example 19 | 3 | | | 3+ | 3+ |
| S/B/–COOH latex [2] | | 9+ | 10 | | |
| S/B [3] | 2 | 3.5 | 5 | 8 | 8 |
| Commercial acrylic latex | 3+ | | | 9 | 9 |

[1] The rating after 107½ hours.
[2] A commercial carboxylated styrene/butadiene latex.
[3] A commercial styrene/butadiene latex in the ratio 60/40.

The results recorded in Table II and Table III show the superiority of the products of this invention as concerns resistance to discoloration with heating of dried films therefrom. Furthermore, the effect of different amounts of copolymerized butadiene on the latex product is shown by the results from Examples 15–18 in Table II, i.e., with increasing amounts of copolymerized butadiene, discoloration upon heat ageing increases.

*Example 21.*—Solution A was prepared by dissolving 150 parts of the same polybutene as used in Example 1 in a solution of 200 parts styrene, 150 parts of 2-ethylhexyl acrylate and 15 parts of carbon tetrachloride. Solution B was prepared by thoroughly mixing 4.5 parts of dry, granular, 15 centipoise methyl cellulose and 15 parts of a solid emulsifier in which the active ingredient is dodecyl benzene sodium sulfonate, then adding with stirring 380 parts of water and allowing the resulting solution to stand overnight before dissolving therein 80 parts of an aqueous emulsifier solution containing about 32 percent of sodium t-butyl naphthalene sulfonate. Solutions A and B were heated separately but concurrently to about 60°. Solution A was stirred vigorously at about 1100 r.p.m. while Solution B was added thereto and the stirring was continued for an additional 20 minutes at that rate. Solution C, which had been prepared previously from 100 parts of water, 2.0 parts of sodium bicarbonate and 3.0 parts of potassium persulfate, was then added. The agitation was reduced to 300 r.p.m. and continued for 6 hours during which the reactants were kept at a temperature in the range from 60° to 65° C. There was obtained thereby a latex of 47.5 percent solids which filtered easily through a 100 mesh screen leaving no residue and which steam distilled easily without noticeable coagulation nor foaminess.

A similar good product was obtained by use of the same materials in substantially the same proportions and by the same process except that the carbon tetrachloride and the dodecyl benzene sodium sulfonate were omitted and the aqueous emulsifier solution contained about 6 parts of sodium t-butyl naphthalene sulfonate and about 2 parts of sodium sulfate per 100 parts of monomer/polymer weight in the starting composition.

*Example 22.*—Solution A was prepared from the same materials in the same proportions as in Example 1. Solution B was prepared from 90 parts of water and 3.0 parts of a 70 percent solution of an ethanolated alkyl guanidine amine complex sold commercially as Aerosol C-61. Solutions A and B were separately but concurrently heated to a temperature of about 70° C. Solution A was stirred vigorously while solution B was added thereto. The resulting emulsion was mixed further on the Eppenbach high shear mixer. Solution C, which previously had been prepared from 10 parts of water and 0.30 part of potassium persulfate, was added to the resulting emulsion which was then adjusted to a pH of below 4 with the minimum amount of sulfuric acid. Agitation in a closed container was continued at 70° C. for 15 hours. The product obtained thereby was a stable latex of 49.4 percent solids which, when filtered through a 100 mesh screen, left no residue. A flexible, extensible, rubbery, coherent, continuous free film was obtained when a thin layer of the latex was allowed to dry under ambient temperature and pressure. A product of the same characteristics was obtained when, for the potassium persulfate in solution C, there was substituted 2 milliliters of 30 percent hydrogen peroxide and 2 milliliters of an aqueous solution containing 500 p.p.m. of ferric nitrate. Further stabilization with a cationic emulsifier such as an alkyl dimethyl hydroxyethyl ammonium bromide sold commercially as Penetronyx D-30 was found advantageous if the latex was steam distilled. The addition to the polymerization recipe of a surface-active cationic monomer, e.g., 2-aminoethyl methacrylate hydrochloride in such amounts as 1.0 and 1.5 parts of the cationic monomer per 100 parts of the monomers and polymer in solution A, was found to enhance the stability of the latex product.

For the Aerosol C-61 in this example, there were substituted other cationic emulsifiers in quantities to give about the same amount by weight of active ingredient to produce stable latexes with very similar properties. Examples of cationic emulsifiers substituted effectively were lauryl dimethyl amine citrate, lauryl dimethyl amine sulfate, and commercial cationic emulsifiers under various trade names including fatty amines and ethylene oxide condensation products with amines.

*Example 23.*—An exterior paint composition was prepared from the latex of Example 1 in the following formulation:

First portion:

| | Percent |
|---|---|
| Water | 21.13 |
| Tamol 731 (25 percent)[1] | .73 |
| Titanium dioxide, rutile | 19.03 |
| Water ground mica, 325 mesh | 2.54 |
| Calcium carbonate | 8.45 |
| ASP-400 clay | 4.66 |
| Ethylene glycol | *1.27 |
| Polypropylene glycol (mol. wt. 1200) | *.17 |
| Methyl cellulose, 4000 cps. | *.34 |

Second Portion:

| | Percent |
|---|---|
| Latex (adjusted to 47 percent solids) | 38.29 |
| Antifoam agent (Nopco 1497)[2] | *.85 |
| Phenyl mercurial preservative | *.51 |
| Nonylphenoxy polyethoxy ethanol | .34 |
| Coloring pigment (phthalocyanine blue) | 1.69 |

* Preblended.
[1] The sodium salt of a diisobutylene/maleic anhydride copolymer at 25 percent concentration.
[2] Predominantly a salt of a sulfated fatty acid at 60 percent solids concentration.

Portion 1 was ground in a Morehouse mill before portion 2 was blended with it. The resulting paint had a Stormer viscosity of about 85 K.U. at 25° C.

The paint was evaluated as to application properties by the subjective tests of brush drag, leveling and open time in comparison with paints prepared in the same formulation from (A) a commercial acrylic latex, and from (B) a commercial latex comprising a copolymer of styrene/2-ethylhexyl acrylate/acrylomitrile/methocrylic acid, both of which are sold for use in paint compositions. Brush drag is the resistance to movement of the brush during application of the paint to a substrate, e.g., wood or another painted surface. Leveling refers to the spontaneous disappearance of brush marks after application but before the paint dries. Open time relates to the length of time during which a freshly painted surface can be rebrushed without adverse effect as in overlapping while brushing the paint on an adjacent area. In brush drag and leveling, the paint from the latex of this invention was about equivalent to the paint from the above latexes A and B. However, in open time, the example of this invention was superior. When the latex of Example 21 was used in a similar pigmented formulation, the leveling was improved considerably. Wooden panels coated with paint films prepared from the latex of Example 1 in the above formulation were exposed for 1000 hours in the Atlas X-W Weather-O-Meter. There was no checking or yellowing of the paint film as a result of such exposure and the color retention was considerably improved compared to paint films prepared in the same manner from the commercial latexes described above and tested concurrently.

*Example 24.*—A latex was prepared from the composition and by the method of Example 21 except that the same quantity (30 parts) of a polybutene of a similar composition but having a lower molecular weight (i.e., about 300) was substituted for the polybutene of that example. A pigmented formulation was prepared from the latex product in a procedure similar to that described in Example 23. The formulation was tested in the following manner to determine whether a portion of a component of the latex would migrate in a manner similar to chemical plasticizers (e.g., dibutyl phthalate). A coat of the latex paint was brushed onto primed Upson Board and was allowed to air dry for 16 hours. It was then over-coated with a commercial green semi-gloss paint. A control was prepared in the same manner and tested concurrently using a commercial acrylic latex containing no plasticizer rather than the latex described above. Comparison of the samples as to drying time and gloss development revealed no significant differences. In this test, if a chemical plasticizer, e.g., dibutyl phthalate, is present in the latex comprising the paint being tested, an increase in drying time and an increase in gloss occurs in the over-coated semi-gloss paint. Thus, this experiment shows that objectional migration of components of the latex, including the polybutene contained therein, does not occur.

The latexes of this invention in addition to being used in the preparation of emulsion paints for the protection of interior and exterior surfaces such as in house paints, also find usefulness as coatings for paper to be used in offset printing processes and in many of the other known uses of stable, film-forming latexes especially in applications requiring resistance to discoloration and embrittlement with ageing and exposure to light.

What is claimed is:
1. A stable, film-forming latex comprising the polymerization product of an aqueous dispersion of
    (1) from about 20 to about 35 percent by weight of an amorphous polybutene having a Staudinger molecular weight of from about 300 to about 11,000 dissolved in
    (2) a monomer mixture comprising
        (a) from about 20 to about 42 percent by weight of a vinyl aromatic compound, and
        (b) from about 23 to about 60 percent by weight of an alkyl ester of acrylic acid in which the alkyl portion has from 4 to 10 carbon atoms,
all percentages being based on the total weight of the amorphous polybutene and the monomer mixture; said polybutene consisting predominantly of units from isobutylene, with minor amounts of units from other butenes.

2. The latex of claim 1 in which the vinyl aromatic monomer is styrene.
3. The latex of claim 1 in which the alkyl ester of acrylic acid is 2-ethylhexyl acrylate.
4. The latex of claim 1 in which the alkyl ester of acrylic acid is isobutyl acrylate.
5. The latex of claim 1 in which the alkyl ester of acrylic acid is n-butyl acrylate.
6. The latex of claim 1 in which the polybutene has a viscosity at 210° F. greater than about 3000 SSU and not greater than that at which the polybutene will flow by gravity to a visually observable extent within about 5 seconds at 210° F.
7. The latex of claim 1 in which the polybutene has a Staudinger molecular weight of from about 1000 to about 8000.
8. The process of preparing a stable, film-forming latex comprising the steps of
    (1) dissolving a polybutene having a Staudinger molecular weight of from about 300 to about 11,000 in a monomer mixture comprising
        (a) a vinyl aromatic monomer, and
        (b) an alkyl ester of acrylic acid in which the alkyl portion has from 4 to 10 carbon atoms to form solution A;
    (2) diluting an ionic emulsifier with water to form aqueous solution B;
    (3) blending solutions A and B to produce an aqueous emulsion;
    (4) mixing with said aqueous emulsion a polymerization catalyst to form the polymerizable emulsion, and
    (5) agitating the polymerizable emulsion at a temperature from about 50° to about 98° C. until polymerization is substantially complete;
wherein the polybutene comprises from about 20 to about 35 percent by weight, the vinyl aromatic monomer from about 20 to about 42 percent by weight and the alkyl ester of acrylic acid from about 23 to about 60 percent by weight, based on the total weight of the polybutene and the monomer mixture; said polybutene consisting predominantly of units from isobutylene, with minor amounts of units from other butenes.

9. The process of claim 8 in which Solution A also contains a non-ionic emulsifier.
10. The process of claim 8 in which the vinyl aromatic monomer is styrene.
11. The process of claim 8 in which the vinyl aromatic monomer is vinyl toluene.
12. The process of claim 8 in which the alkyl ester of acrylic acid is 2-ethylhexyl acrylate.
13. An aqueous dispersion paint comprising an aqueous dispersion of
    (1) a finely-divided pigment, and
    (2) a polymer paint vehicle consisting of a latex comprising the polymerization product of an aqueous dispersion of
        (a) from about 20 to about 35 percent by weight of an amorphous polybutene having a Staudinger molecular weight of from about 300 to about 11,000 dissolved in
        (b) a monomer mixture comprising from about 20 to about 42 percent by weight of a vinyl aromatic compound and from about 23 to about 60 percent by weight of an alkyl ester of acrylic acid in which the alkyl portion has from 4 to 10 carbon atoms;
all percentages being based on the total weight of the polybutene and the monomer mixture; said polybutene consisting predominantly of units from isobutylene, with minor amounts of units from other butenes.

14. The aqueous dispersion paint of claim 13 in which the vinyl aromatic monomer is styrene.
15. The aqueous dispersion paint of claim 13 in which the vinyl aromatic monomer is t-butyl styrene.
16. The aqueous dispersion paint of claim 13 in which the alkyl ester of acrylic acid is 2-ethylhexyl acrylate.

References Cited by the Examiner
UNITED STATES PATENTS

| | | | |
|---|---|---|---|
| 2,973,285 | 2/1961 | Berke et al. | 260—29.6 |
| 3,089,832 | 5/1963 | Black et al. | 260—885 |
| 3,162,696 | 12/1964 | Zimmerman et al. | 260—878 |

MURRAY TILLMAN, *Primary Examiner.*
SAMUEL H. BLECH, *Examiner.*
P. LIEBERMAN, *Assistant Examiner.*